US008016169B2

(12) United States Patent  (10) Patent No.: US 8,016,169 B2
Blandini et al.  (45) Date of Patent: Sep. 13, 2011

(54) DISTRIBUTOR OF NATURAL ANTAGONISTS OR THE LIKE

(75) Inventors: Giacomo Blandini, Catania (IT); Sabina Failla, Catania (IT); Giuseppe Manetto, Catania (IT)

(73) Assignee: Universita Degli Studi Di Catania, Catania (IT)

( * ) Notice: Subject to any disclaimer, the term of this patent is extended or adjusted under 35 U.S.C. 154(b) by 0 days.

(21) Appl. No.: 12/521,071

(22) PCT Filed: Dec. 21, 2007

(86) PCT No.: PCT/IB2007/055280
§ 371 (c)(1),
(2), (4) Date: Jun. 24, 2009

(87) PCT Pub. No.: WO2008/084355
PCT Pub. Date: Jul. 17, 2008

(65) Prior Publication Data
US 2010/0018446 A1  Jan. 28, 2010

(30) Foreign Application Priority Data

Jan. 5, 2007 (IT) .............................. RM2007A0006

(51) Int. Cl.
*A01C 7/16* (2006.01)
*A01C 15/00* (2006.01)
*A01C 17/00* (2006.01)
*E01C 19/20* (2006.01)

(52) U.S. Cl. .......... 222/626; 239/684; 239/687; 111/11; 224/509; 224/533; 224/553

(58) Field of Classification Search .................. 239/172, 239/289, 650, 661, 663, 672, 675, 677, 681, 239/684, 687; 224/404, 500, 509, 513, 533, 224/544, 553; 222/505, 626; 296/50–55; 111/130, 11–13
See application file for complete search history.

(56) References Cited

U.S. PATENT DOCUMENTS 2,841,401 A   7/1958   Mascaro
5,054,693 A   10/1991  Chow
6,089,478 A   7/2000   Truan et al.

FOREIGN PATENT DOCUMENTS

DE   9411433   11/1994
DE   20117007  12/2001

OTHER PUBLICATIONS

PCT International Search Report for PCT/IB2007/055280 filed on Dec. 21, 2007 in the name of Universita Degli Studi Di Catania.
PCT Written Opinion for PCT/IB2007/055280 filed on Dec. 21, 2007 in the name of Universita Degli Studi Di Catania.

*Primary Examiner* — Christopher J. Novosad
(74) *Attorney, Agent, or Firm* — Steinfl & Bruno LLP

(57) ABSTRACT

The present invention relates to a device to be used for the mechanized distribution of natural antagonists for the treatment of crops grown in greenhouse or in open field, under organic and/or integrated regimen, improving uniformity of distribution and concomitantly reducing the time spent in the distribution, with respect to other known systems in the current state of the art.

3 Claims, 2 Drawing Sheets

DISTRIBUTOR OF NATURAL ANTAGONISTS OR THE LIKE

CROSS REFERENCE TO RELATED APPLICATIONS

The present application is the US national stage of International Application PCT/IB2007/055280 filed on Dec. 21, 2007 which, in turn, claims priority to Italian Application RM2007A000006, filed on Jan. 5, 2007.

INTRODUCTION

The present invention relates to a device to be used for the mechanized distribution of natural antagonists for the treatment of crops grown in greenhouse or in open field, under organic and/or integrated regimen.

TECHNOLOGY BACKGROUND

Over the last decade, Italy has been directly involved in a remarkable increase of in-earth open-field organic cultivation, boosted, besides from EC Rules and provisions, also by the need to adopt environment-friendly farming techniques, capable of keeping costs low and yielding "residue-free" produce, as ever more frequently required by the consumer.

Currently, biological control of pests makes it possible to control many phytophages, without causing phytotoxicity phenomena to humans and other non-harmful living organisms, with no need to comply with the latency periods—in short, yielding quality produce with a low environmental impact.

DESCRIPTION OF THE PRIOR ART

Biological defense of vegetables in a protected environment envisages the use of natural antagonists, by seasonal inoculations or inundative releases. Such antagonists are reared by "bioplants", already active for several years, and marketed in plastic bottles having different volumes (250, 500 and 1000 $cm^3$) along with the dispersing material (generally vermiculite and/or buckwheat chaff, rarely sawdust) most times having a certain degree of moisture. Current manual release on infested plants entails considerable time expenditure by the technical operator, yet not attaining an even distribution of the antagonists.

Studies carried out on options to mechanize these defense interventions are still limited: on extensive crops, tests have been performed by small aircrafts or tractor-towed air flow distributors, whereas, for use on protected crops, portable mechanical equipments have recently been set up which perform the release thanks to a fan-generated air current.

OBJECTS OF THE INVENTION

Object of the present invention is to solve said problems by providing a device suitable for the mechanized distribution of dispersing material as substantially described in claim 1.

ADVANTAGES OF THE INVENTION

The device subject-matter of the present invention utilizes operation principles different from those found in the current state of the art, and that, following several laboratory tests, proved suitable and favorable to a mechanized distribution of natural antagonists. In a protected environment, e.g., by the advance of the operator between planted rows it is possible to attain, with improved uniformity and saving time with respect to the manual operation, the distribution of antagonists on the plants.

Hence, the subject-matter of the present invention meets the need to improve competitiveness and productivity, e.g. of the sector of greenhouse vegetable produce, thereby having a decisive role in the biological defense of cultures.

BRIEF DESCRIPTION OF THE DRAWINGS

Further advantages, features and operation modes of the present invention will be made apparent in the following detailed description of some embodiments thereof, given by way of example and not for limitative purposes, making reference to the figures of the annexed drawings, wherein.

DETAILED DESCRIPTION OF THE DRAWINGS

The device, as it will be made evident hereinafter, bases its operation principle on the centrifugal force generated by a rotary disc, a force giving to the product to be distributed the kinetic energy required to be distributed where required.

Figure 1:
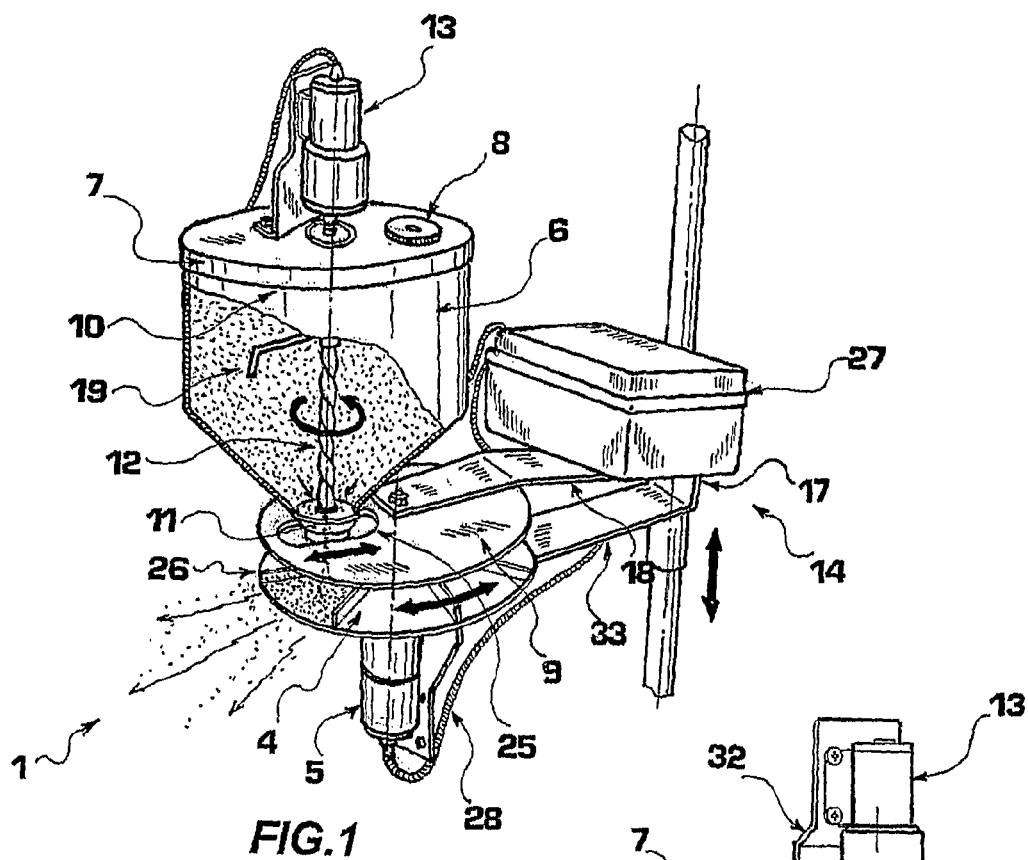
FIG. 1 depicts a perspective view of an embodiment of a device 1 subject-matter of the present invention.

Referring to FIG. 1, it is depicted in a perspective view an embodiment of the device 1 subject-matter of the present invention.

The various members of said device 1 are mounted, in the manner that will be made evident hereinafter, on a base structure 14, which comprises a vertical post 17 from which two horizontal posts 18 and 33, substantially parallel therebetween, branch off.

The product to be distributed is poured into a hopper 6, of a substantially conical shape, having an inlet section 10 and an outlet section 11. Said hopper 6 comprises, at the inlet section 10, a removable cover 7 equipped with a charging mouth 8 through which the product is charged into the hopper.

Therefore, the hopper 6 functions as accumulation tank for the product to be distributed; product is outlet through the outlet section 11 and falls on a rotary disc 4 located therebelow.

In order to adjust according to contingent needs of use the flow rate of the product to be distributed, on the vertical axis of the hopper 6 there rotates a worm screw 12 whose bottom end lies substantially at the outlet section 11. Said worm screw 12 is set in rotation by use of an electric motor 13, preferably adjustable speed, DC and low-voltage.

Hence said worm screw serves as "helical meter", as the flow rate of product outlet from the hopper 6 may be adjusted by setting the number of revolutions to be imparted to the worm screw, or by modifying the outlet section diameter with suitable tools (not shown in figure) of selectable diameter, or lastly by varying the diameter of the worm screw, the latter being an interchangeable member of the device.

Moreover, said worm screw is provided, at various heights thereof, with stirrers 19, in this specific embodiment being comprised of flexible tangs.

Said stirrers have the task of regularizing product inflow to the dispersing disc 4, avoiding possible clogging inside of the hopper.

Said outlet section of the hopper is fixed at a through hole 25, obtained on a support member 9, of a substantially circular shape, whose center is set at the end of the longitudinal post 18, and that is free to pivot thereabout.

Hence, it is clear that the angle with respect to the axis of symmetry of the base structure 14, with which the product to be distributed is projected, can be adjusted by angularly varying the position of the hopper by means of the rotation of the circular support 9 about the post 18. Preferably, the through hole 25 has an elongate shape, radially arranged slot-like. In this case, hopper positioning means are advantageously provided also in the radial direction along said slot.

Located below said circular support 9, in a substantially parallel position, the dispersing disc 4 is fixed to the bottom longitudinal post 33.

Such a dispersing disc 4 is provided, along its radial development, with a plurality of flaps 26, and it is set in rotation about the vertical axis by the use of drive means 5, comprising a variable speed motor, preferably DC and low-voltage.

Therefore, the base structure 14, and in particular the two posts 18 and 33, hold together at a set distance the support member 9 of the hopper-meter assembly and the dispersing disc 4.

The product outlet from the outlet section of the hopper 6 falls on the dispersing disc 4 that, set in rotation by the drive means 5, transfers kinetic energy to the product being outlet, imparting to the product a velocity intimately linked to the number of revolutions of the dispersing disc, the number of flaps obtained thereon, the radial position of the outlet section of the hopper with respect to the dispersing disc, and the constituent material of the dispersing disc.

Said drive means 5 and 13 may be power-fed by a battery pack 27, it also fixed to the top longitudinal post 18 and connected to the motors by connecting means 28.

Of course, it is understood that the battery pack could be differently located, or could also be carried in a knapsack by the user.

Figure 2:
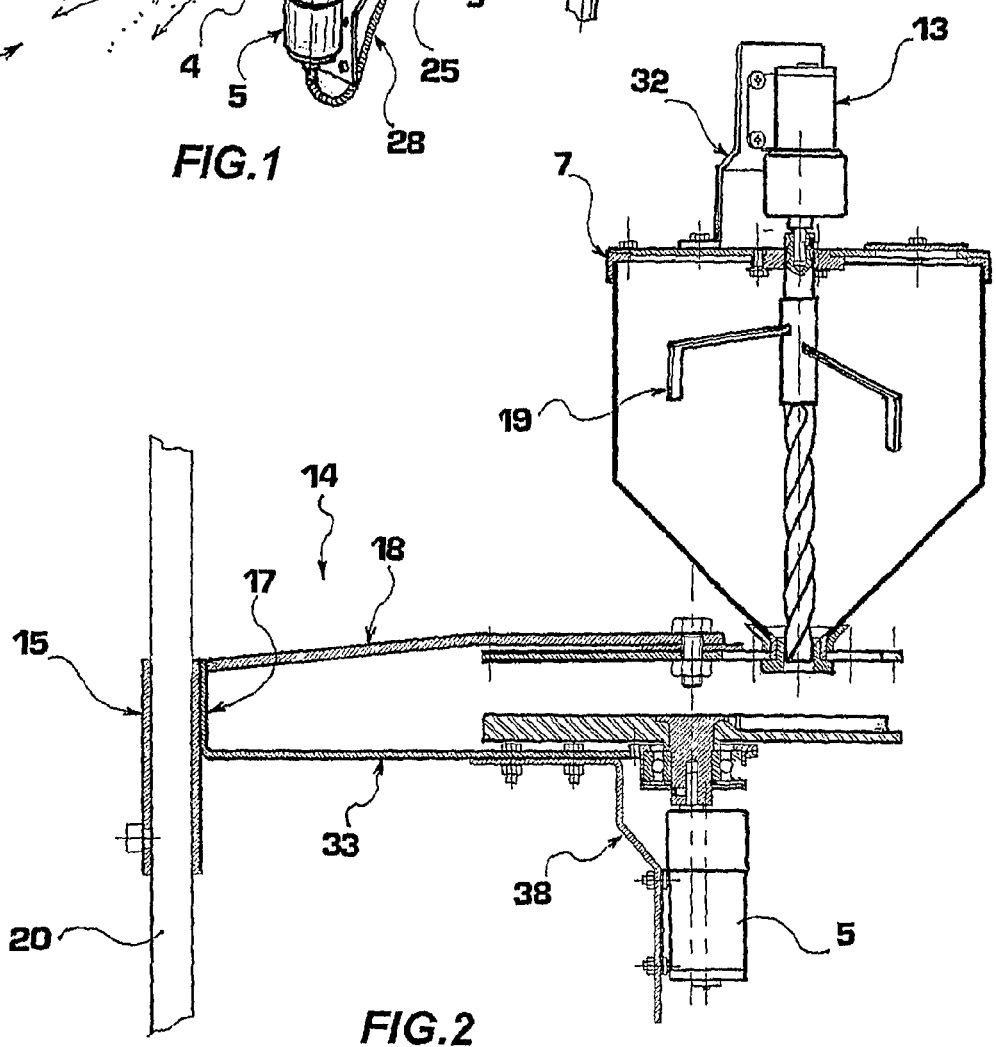
FIG. 2 shows a vertical section of the device 1 subject-matter of the present invention.

FIG. 2 shows a vertical section of the device subject-matter of the present invention.

In particular, the figure shows more clearly how the base structure 14 is constituted and how it holds together the hopper 6 and the dispersing disc 4.

Always referring to FIG. 2, it is better evident how the motor 5 is held in a vertical position. In fact, it is fixed to the longitudinal post 33 by means of a connecting element 38.

The motor 13 is instead located integrally to the cover 7 by means of a union 32.

Moreover, the base structure 14 comprises a tubular portion 15 apt to slide and be fixed in the preferred position on a vertical rod 20.

Therefore, the subject-matter of the present invention may be implemented with systems apt to adjust and keep constant the distribution height and, currently, it was conceived to be hand-carried by an operator advancing between rows of the crop to be defended, or to be applied on tractor-towed bars, on monorails or other devices allowing the advance thereof along the rows of the crops to be treated.

The device as described hereto could easily be hand-carried by a user, who could advantageously support it by means of the rod 20. Alternatively, the use of support belts or the like could be envisaged to allow the user to "don" the device.

Figure 3:
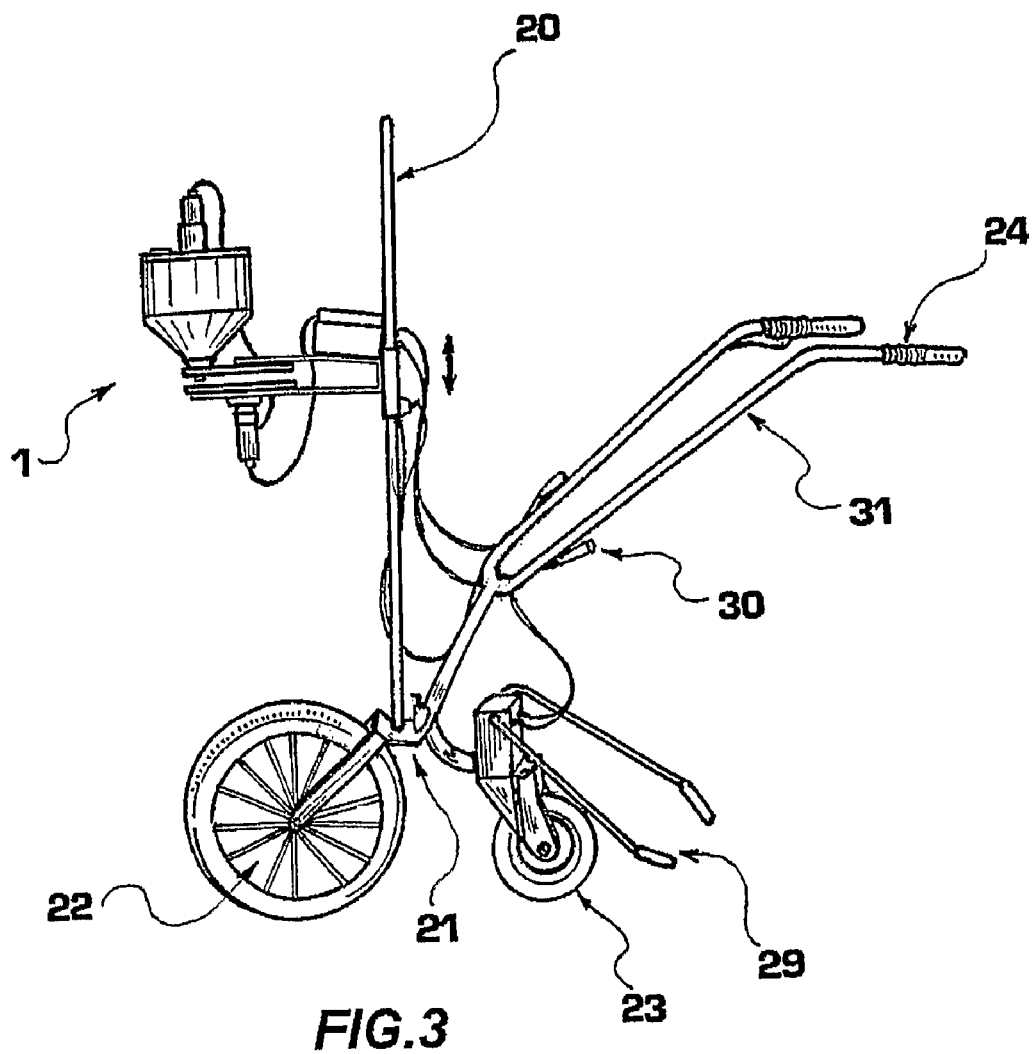
FIG. 3 shows the assembly view of a movable apparatus for the distribution of products (natural antagonists and dispersing material) utilized in organic or integrated agriculture that uses the device 1.

Moreover, as shown in FIG. 3, the present invention provides a movable apparatus apt to bear a distribution device as described hereto, and which can be carried by an operator.

Therefore, the apparatus comprises a rod 20 onto which the device 1 is fixed; the rod 20 may be welded on a support frame 21 having a front wheel 22 and a rear wheel 23. The wheel 22, serving as support, rotates about its own horizontal axis, fixed by a fork (not shown in figure) borne by the frame 21.

The apparatus is held in a correct position by the second wheel 23, of pivoting type in order to facilitate the changes of direction.

To the frame 21 there are connected a stand 29 and two handlebars 31 whose height is adjustable by the operator by means of a suitable pin 30. At the top ends of said handlebars 31 there are positioned two rubber handgrips 24 to make the gripping more ergonomic and safe; also, near one of the two handgrips there are located the control switches (not shown in figure) for motor operation.

Lastly, the device 1 may be fixed along the vertical rod 20 to adapt the distribution height to the specific crop and to its vegetative stage.

In order to assess the suitability of the operation principle to the distribution of antagonists and the dispersing material with which they are marketed, it was preliminarily tested that:
  antagonists are not damaged, neither by transiting through the meter nor by effect of the centrifugal dispersing disc;
  adequate doses can be distributed;
  product reaches the target;
  dimensions and total mass are compatible with a system that can be hand-carried;
  manufacturing costs are reasonable and environmental impact is practically nil.

In the embodiment shown here, the hopper is made of polypropylene and has a capacity sized so as to work with no need of replenishments along the route in a greenhouse of about 10,760 sq. ft. The dispersing disc is preferably made of PVC.

The above-described system may optionally be optimized by utilizing materials more suitable and lighter-weighted, yet perfectly meeting the aims for which the device has been made. Moreover, large-scale production processes should further reduce the already reasonable production costs, thereby enabling a widespread diffusion of the invention among farmers.

The embodiment shown hereto has been illustrated by way of example and not for limitative purposes, it being understood that the same operation principle may find application in other contexts as well, with embodiments different and yet all falling within the protective scope set forth by the claims hereinafter.

The invention claimed is:

1. A device for mechanized distribution of agricultural products comprising:
   a base structure to which:
     a) means for controlled feeding of said agricultural products;
     b) a rotary dispersing disc, adapted to receive thereon said agricultural products fed by said feeding means; and
     c) drive means connected to said rotary dispersing disc and adapted to set the rotary dispersing disk in rotation are connected,
   said rotary dispersing disc comprising a plurality of flaps arranged along a radial development of said rotary dispersing disc,
   wherein said feeding means comprises a substantially conical hopper comprising an inlet section and an outlet section,
   wherein said feeding means comprises a support member of said hopper, pivotally mounted on said base structure, wherein said support member has a substantially circular shape, is substantially overlapping the dispersing disc and has at least one through hole at the outlet section of the hopper.

2. The device according to claim 1, wherein said through hole is slot-shaped and the support member comprises means for positioning the hopper along said slot-shaped through hole.

3. A device for mechanized distribution of agricultural products comprising:
 a base structure to which:
  a) means for controlled feeding of said agricultural products;
  b) a rotary dispersing disc, adapted to receive thereon said agricultural products fed by said feeding means; and
  c) drive means connected to said rotary dispersing disc and adapted to set the rotary dispersing disk in rotation are connected,
 said rotary dispersing disc comprising a plurality of flaps arranged along a radial development of said rotary dispersing disc,
 wherein said feeding means comprises a substantially conical hopper comprising an inlet section and an outlet section,
 wherein said feeding means comprises a support member of said hopper, pivotally mounted on said base structure,
 wherein said support member of said hopper is fixed in a position substantially parallel to said dispersing disc.

* * * * *